INVENTOR.
Arthur F. Grant

United States Patent Office 2,956,659
Patented Oct. 18, 1960

2,956,659

MODULATING CONTROL FOR FLUID PRESSURE ACTUATED CLUTCHES AND BRAKES

Arthur F. Grant, Cleveland, Ohio, assignor to General Motors Corporation, Detroit, Mich., a corporation of Delaware Filed Apr. 4, 1958, Ser. No. 726,494

7 Claims. (Cl. 192—85)

This invention relates to fluid pressure actuated torque absorbing or transmitting mechanisms such as brakes and clutches, and more particularly to a modulating control mechanism for such devices.

While the invention is applicable to fluid pressure operated clutches and brakes generally, it has particular application to coupling devices intended to provide controlled slip characteristics between power input and output members such as in a marine drive having a minimum speed prime mover, such as an internal combustion engine. In such applications, it is necessary for the coupling to slip the speed and torque of the prime mover between an output shaft speed corresponding to the engine idle speed when the coupling is locked up down to an essentially no-speed output condition. The torque transmitted between the driving and driven members of such a coupling operating under slip conditions is generally proportional to the actuating force imposed thereon. However, pressure regulating devices tend to be somewhat unstable when supplying the relatively low actuating pressures required for at least a portion of the slip operating range. Consequently, smooth slip characteristics are difficult to attain with such fluid actuated couplings since any pressure pulsations applied to the fluid actuating mechanisms result in corresponding variations in the speed and torque transmitted to the output shaft of the coupling. Such rough operation is necessarily destructive on the several elements of the clutch or coupling as well as on the engine.

In its broader aspects, the invention contemplates providing a fluid pressure actuated coupling mechanism with a modulating control means operable in opposition to the fluid actuating pressure supplied to provide accurate linear control of the slip characteristics of the coupling. The invention further contemplates limiting the actuating fluid supplied to the coupling mechanism to a minimum pressure at which an associated pressure regulating supply mechanism is capable of supplying a relatively stable pressure and providing a modulating control means operable in opposition to the fluid actuating pressure thus supplied to provide accurate linear control of the slip control characteristics of the coupling between zero output shaft speed and a speed corresponding to engine idle speed.

Figure 1:
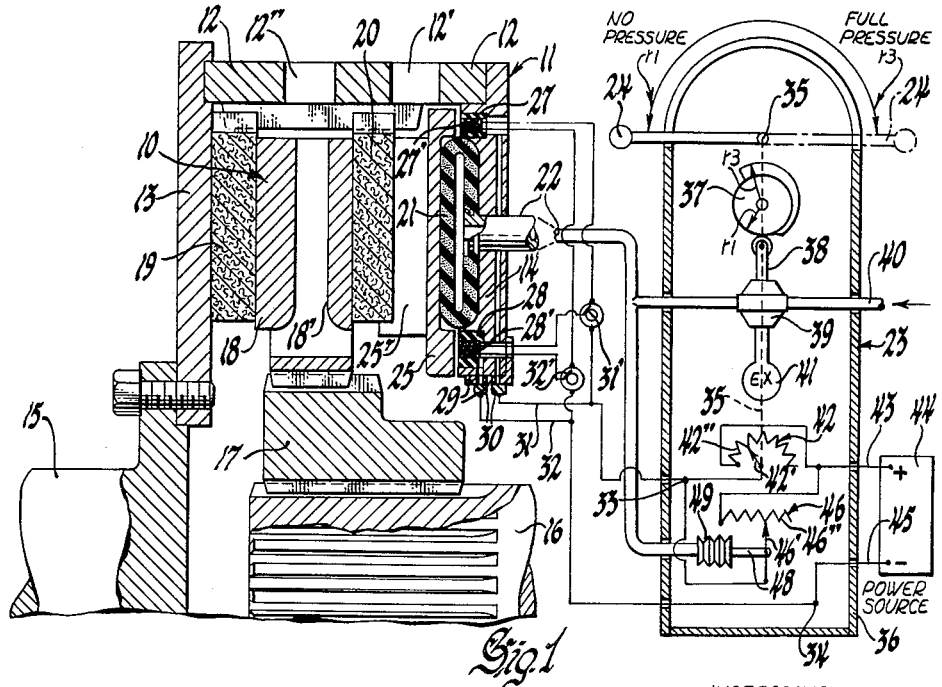
Figure 2:
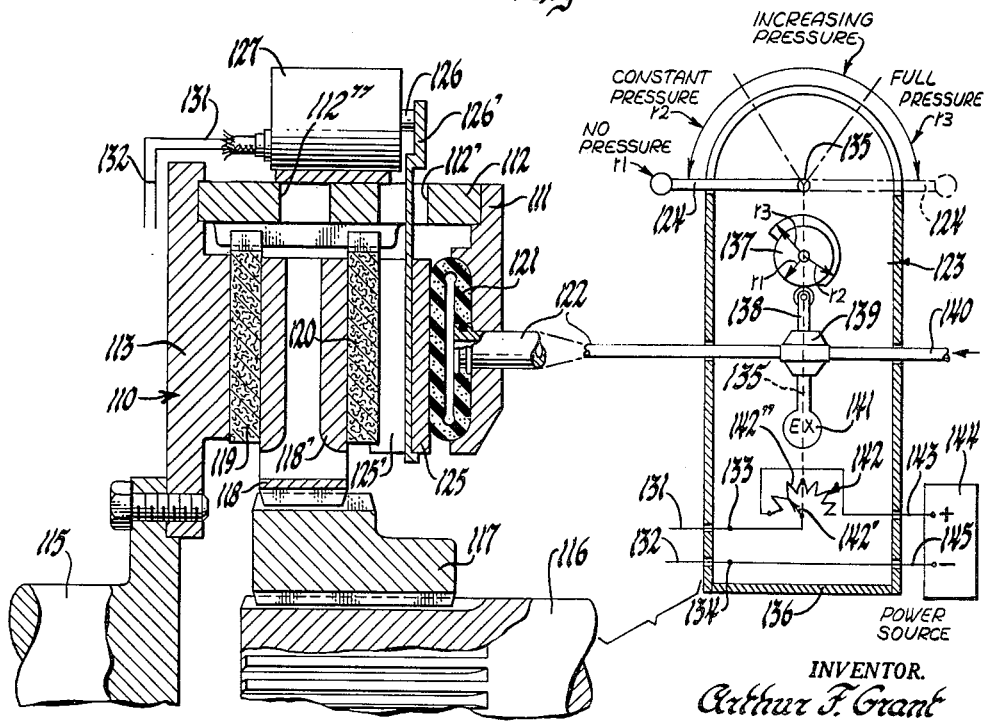

The foregoing and other objects, advantages and features of the invention will become apparent to those skilled in the art from the following detailed description of several illustrative embodiments of the invention having reference to the accompanying drawing in which:

Figure 1 is a somewhat diagrammatic view showing a portion of a fluid pressure actuated clutch mechanism in longitudinal section and a control mechanism therefor as embodied in one form of the invention; and Figure 2 is a view similar to Figure 1 showing a modified form of the invention.

Referring more particularly to the drawing, Figure 1 shows a fluid pressure actuated clutch or coupling indicated generally by the reference numeral 10. The coupling 10 comprises a casing 11 including a cylindrical member 12 which is interposed between the outer peripheries of two axially spaced annular end plates 13 and 14. The end plate 13 is carried by a power input shaft 15 which is adapted to be rotatably driven by a prime mover such as a diesel engine. The casing 11 spacedly embraces a power output driven shaft 16 which is spaced axially from the end of the driving shaft 15. A hub or adapter member 17 is slidably splined on the end of the shaft 16 and is externally and slidably splined to an output clutch plate or member 18. The plate 18 is sandwiched between two driving friction plates 19 and 20 which are externally and slidably splined to the cylindrical member 12.

The end plate 14 carries an annular inflatable tube 21 which is connected through a suitable rotary valve or seal, not shown, and a pipe 22 to a control stand 23. The control stand is operable to regulate fluid pressure for supply to the tube 21 in accordance with the movement of a control lever 24 between a no-pressure supply position and a maximum pressure supply position. The fluid pressure thus supplied inflates the tube 21 which in turn acts through an annular spacer plate 25 and biases the plates 18, 19 and 20 axially to establish frictional driving engagement therebetween proportional to the supplied pressure. As indicated at 12', 12'', 18' and 25', the casing member 12 and the plates 18 and 25 have a plurality of radial ports or passages therein adapted to induce radial flow of cooling air through the coupling unit.

In accordance with the invention, a means is provided for modulating the biasing action of the tube 21 on the several clutch plates to provide precise control of the actuating force applied thereto over the slip operating range of the coupling. In the form of the invention of Figure 1, this modulating means includes the spacer plate 25 which also serves as a magnetic armature for two annular electromagnets 27 and 28 which are carried by the end plate 14 in radially spaced relation to the tube 21. Each of these electromagnets 27 and 28 comprises an annular pole member of channel section opening toward the armature plate 25 and mounting an annular field coil winding 27' and 28' therein, respectively. The field coil windings 27' and 28' are connected through suitable slip rings 29, brushes 30, and leads 31 and 32 to outlet terminals 33 and 34 of the control stand 23 which is operable to provide an electrical potential for energizing the field coil windings 27' and 28' in accordance with the movement of the control lever 24. When thus energized, the electromagnets 27 and 28 attract the spacer plate 25 to provide a biasing action thereon substantially proportional to the current supplied and in opposition to the fluid pressure biasing action of the tube 21. In the drawing, the connections provided by the ring and brushes are shown schematically at 31' and 32'.

The control stand 23 includes the control lever 24 which is secured at one end to a control shaft 35 journaled in a control stand housing 36. The control shaft 35 carries a cam 37 which is engaged by a cam following valve member 38 of a pressure regulator valve 39. The pressure regulator valve 39 is connected by a pipe 40 to a suitable source of pressurized fluid, not shown, and is operable to regulate the pressure of fluid supplied to the inflatable tube 21 through the pipe 22 in accordance with the movement of the valve member 38 between a first no-pressure-supply position wherein the pipe 22 is connected to an exhaust header 41 and a maximum pressure supply position. The cam 37 is provided with a minimum radius surface portion $r_1$ thereon permitting the valve member 38 to be returned to its no-pressure-supply position whenever the control lever 24 is in its no-pressure-supply position. Upon movement of the control lever 24 from its no-pressure-supply position, the valve member 38 engages a slight rise on the cam 37 and is actuated thereby to an initial pressure supply position. The configuration of the cam 37 is such that further movement of the control lever toward its full-pressure-supply position causes a progressive increase in the pressure supplied to the coupling unit up to the maximum pressure supply condition wherein the valve member 38 engages a maximum radius surface portion of the cam, $r_3$.

In addition to the pressure regulating supply means, the control stand 23 includes means for varying the energization of the electromagnets 27 and 28 in accordance with the movement of the control lever 24. This means includes a rheostat 42 having a movable contact 42' which is carried by the control shaft 35. The contact 42' is connected electrically to the control stand outlet terminal 33 and movably contacts a variable resistance element or contact 42" which is connected by a line 43 to one terminal of a suitable power source, indicated at 44. The other control stand outlet terminal 34 is connected directly to the other terminal of the electrical power source by a line 45. In the form of the invention shown in Figure 1, a second rheostat 46 is connected in parallel with the rheostat 43 having a movable contact 46' which is connected to the terminal 33 and contacts a variable resistance element which is connected at one end to the line 43. The movable contact 46' of the rheostat 46 is operably connected to the output member 48 of a pressure responsive element 49 which is connected to the clutch inflation pressure supply pipe 22. The rheostat 46 is thus rendered responsive to variations in the pressure supplied to the inflatable tube 21 and varies the excitation of the field coil winding 27' and 28' to compensate for fluctuations in the supply pressure thereby providing precise control of the actuating force applied to the several clutch plates and hence of the torque and slip operating characteristics of the coupling.

When the control lever 24 is in its no-pressure-supply position, the inflation tube 21 is connected to the exhaust header through the regulator valve 39, the energization of the electromagnets 27 and 28 insuring disengagement of the several clutch plates. Upon movement of the control lever from its no-pressure-supply position, the regulator valve member 38 is initially actuated by the slight rise on the cam 37 to supply fluid at a pressure sufficient to overcome the biasing action of the electromagnets. As the control lever is moved further in an increasing pressure direction, the resultant clutch actuating force provided by the progressively increasing pressure and the decreasing electromagnetic fields progressively increases, thereby further increasing the torque capacity effected through clutch plate engagement. Movement of the control lever 24 in an increasing pressure direction beyond an intermediate position thereof towards its full-pressure-supply position carries the movable rheostat contact 42' out of contact with the variable resistance contact 42" thereby fully deenergizing the electromagnets 27 and 28 and permitting full utilization of the supplied pressure for torque capacity.

Movement of the control lever 24 in a decreasing pressure direction from its full-pressure-supply posiiton similarly effects a reduction in the supplied pressure through the operation of the regulator valve 39 until the control lever again reaches its intermediate position wherein the movable contact 42' is again brought into contact with the resistance element of the rheostat 42. Beyond this intermediate position, the effective clutch actuating pressure again becomes the resultant of the biasing actions of the supplied pressure and the magnetic fields established by the energization of the two electromagnets.

The configuration of the cam 37 is preferably such that the intermediate position of the control lever corresponds to the minimum pressure at which the pressure regulator valve is capable of supplying a relatively stable pressure. Below this minimum pressure any fluctuation in the pressure supplied to the inflation tube causes the pressure responsive rheostat 46 to effect a variation in the magnetic field excitation to compensate therefor.

In Figure 2, those elements which are the same as, similar to, or correspond functionally to the same elements of the embodiment of Figure 1 are designated by the same last two digits as the reference numeral of Figure 1 but are preceded by the numeral 1. Hence, the coupling unit of the embodiment of Figure 2 is designated as 110 and the control stand therefor is designated 123.

In the form of the invention of Figure 2, a plurality of plunger type solenoids 127 are mounted in equiangularly spaced relation externally of coupling casing member 112. Each of the solenoids 127 is connected through leads 131 and 132 and suitable ring and brush constructions, not shown, to outlet terminals 133 and 134 of the control stand 123. A plunger type armature 126 is reciprocably mounted within each of the solenoids 127 and is adapted to thrustably engage an annular member 126' upon energization of the solenoid units. The annular member 126' is provided with a plurality of fingers extending radially inwardly from the plunger engaging outer ring portion thereof and through the cooling air passage 112' and 125'. These fingers thrustably engage the plate 125 and apply the biasing action of the solenoids 127 thereto in opposition to the clutch actuating pressure provided by the controlled inflation of the annular tube 121.

The control stand 123 includes an inflation pressure controlling cam carried by a control shaft 135 which is journaled in the control stand casing 136. As in the embodiment of Figure 1, the control shaft 135 and the cam 137 are rotatable by movement of a control lever 124 between a neutral or no-pressure position and a full-pressure-supply position. The configuration of the cam 137 is such that when the control lever 124 is in its no-pressure position, a cam following valve member 138 of a pressure regulator valve 139 contacts a minimum radius surface of the cam and interconnects the pipe 122 leading to the inflation tube 121 to an exhaust header 141. Upon movement of the control lever 124 from its no-pressure position the valve member 138 is actuated by an initial rise on the cam 137 to supply the minimum stable pressure which the pressure regulator valve is capable of supplying. This initial rise on the cam subtends an angular sector of the cam surface at a constant radius thus providing minimum stable supply pressure to the inflation tube 121 through a range of movement of the control lever 124 to an intermediate position thereof. Further movement of the control lever 124 beyond this intermediate position carries the cam beyond its minimum pressure supplying surface portion with respect to the valve member 138 and causes cam actuation of the valve member to progressively increase the pressure supplied to the inflation tube until a maximum pressure supplying condition is reached corresponding to a third constant radius surface provided on the cam 137.

To modulate the clutch actuating biasing action of the inflation tube when the control lever 124 is being actuated through its minimum pressure supply range, the control stand 123 is provided with a rheostat 142 which is operable to vary the excitation of the solenoids 127 in accordance with movement of the control lever 124 in this operating range. The rheostat 142 includes a movable contact 142' which is carried by the control shaft 135. The movable contact 142' is electrically connected to the outlet terminal 133 of the control stand and slidably engages a variable resistance contact element 142", one end of which is connected by line 143 to a suitable power source indicated at 144. The opposite terminal of the power source is connected by a line 145 to the other outlet terminal 134 of the control stand.

Movement of the control stand lever 124 through its minimum constant pressure supply range toward its intermediate position results in a progressive reduction in the energization of the solenoid 127 thereby progressively increasing the effective actuation force applied to the clutch plates by the minimum constant pressure supplied and movement beyond the intermediate control lever position carries the movable contact 142' out of engagement with the variable resistance element 142" to fully deenergize the solenoids 127. Thus clutch actuation upon movement of the control lever beyond its intermediate position is effected solely by the controlled inflation pressure supplied to the clutch actuating tube 121.

While the description of the instant invention has been made with reference to two preferred embodiments thereof, it will be obvious to those skilled in the art that various changes and modifications might be made therein without departing from the spirit and scope of the invention as defined in the following claims.

I claim:

1. A control mechanism for a clutch having driving and driven clutch members supported for relative rotation and shiftable into frictional torque-transmitting engagement proportional to the actuating pressure applied thereto, said control mechanism comprising fluid pressure means carried by one of said members and operable to bias said members into frictional engagement, electromagnetic means carried by said one member and energizable to oppose the biasing action of said fluid pressure means, a first control means including a control element movable between a minimum pressure supply position and a maximum pressure supply position and operable to progressively regulate and supply fluid pressure to said fluid pressure means in accordance with the movement of said control element between said positions, and a second control means associated with said first control means and operable to progressively decrease electrical energization of said electromagnetic means in accordance with the movement of said control element between said minimum pressure supply position and an intermediate pressure supply position and to de-energize said electromagnetic means upon movement of said control element beyond said intermediate pressure supply position towards said maximum pressure supply position.

2. A control mechanism for a clutch having driving and driven clutch members supported for relative rotation and for frictional engagement therebetween, said control mechanism comprising fluid pressure means carried by one of said members and operable to bias said members into frictional torque-transmitting engagement proportional to the pressure supplied thereto, electromagnetic means carried by said one member and energizable to oppose the biasing action of said fluid pressure means, a first control means including a control element movable between a "no-pressure" supply position and a "full-pressure" supply position and operable to progressively regulate and supply fluid pressure to said fluid pressure means in accordance with the movement of said control element from said "no-pressure" position toward said "full-pressure" position, and a second control means associated with said first control means and operable to vary electrical energization of said electromagnetic means in accordance with the movement of said control element thereby controlling the torque transmitting engagement effected between said members.

3. A control mechanism for a torque transmitting device having a plurality of members supported for relative rotation and shiftable into frictional torque-transmitting engagement proportional to the actuating pressure applied thereto, said control mechanism comprising fluid pressure means operable to bias said members into frictional engagement, electromagnetic means energizable to oppose the biasing action of said fluid pressure means, a first control means including a control element movable between two extreme pressure supply positions and operable to regulate the supply of fluid pressure to said fluid pressure means in accordance with the movement of said control element, and a second control means associated with said first control means and operable to vary the electrical energization of said electromagnetic means in accordance with the movement of said control element whereby said fluid pressure means and said electromagnetic means coact to control the torque-transmitting frictional engagement effected between said members.

4. A torque transmitting device including a plurality of driving and driven members supported for relative rotation and shiftable into frictional torque-transmitting engagement proportional to the actuating pressure applied thereto, fluid pressure means operable to bias said members into frictional engagement, electromagnetic means energizable to oppose the biasing action of said fluid pressure means, a first control means operable to supply fluid pressure to said fluid pressure means, and a second control means operable to vary electrical energization of said electromagnetic means in accordance with the operation of said first control means, whereby the biasing action of said fluid pressure means is limited by said electromagnetic means to control the torque-transmitting frictional engagement effected between said members.

5. A torque transmitting mechanism comprising a plurality of driving and driven members supported for relative rotation and shiftable into frictional torque-transmitting engagement proportional to the actuating pressure applied thereto, fluid pressure means operable to bias said members into frictional engagement, electromagnetic means energizable to oppose the biasing action of said fluid pressure means, a first control means operable to supply fluid pressure to said fluid pressure means, and a second control means operable in response to the fluid pressure supplied to said fluid pressure means to vary electrical energization of said electromagnetic means whereby the biasing action of said fluid pressure means and thereby the torque-transmitting frictional engagement effected between said members is modulated by said electromagnetic means in accordance with variations in the fluid pressure supplied to said fluid pressure means.

6. A control mechanism for a torque transmitting device having driving and driven members supported for relative rotation and shiftable into frictional torque-transmitting engagement proportional to the actuating pressure applied thereto, said control mechanism comprising fluid pressure means operable to bias said members into frictional engagement, electromagnetic means energizable to oppose the biasing action of said fluid pressure means, a first control means including a movable control element and operable upon movement of said control element through a first range to supply a constant fluid pressure to said fluid pressure means and upon movement of said control element through a second range to progressively increase the fluid pressure supplied to said fluid pressure means up to a predetermined maximum pressure, and a second control means associated with said first control means and operable to vary the electrical energization of said electromagnetic means in accordance with the movement of said control element in said first range whereby the biasing action of said fluid pressure means is modulated by said electromagnetic means to control the torque-transmitting frictional engagement effected between said members.

7. A control mechanism for a torque transmitting device having driving and driven members supported for relative rotation and shiftable into frictional torque-transmitting engagement proportional to the actuating pressure applied thereto, said control mechanism comprising fluid pressure means operable to bias said members into frictional engagement, electromagnetic means energizable to oppose the biasing action of said fluid pressure means, a first control means including a control element movable between a minimum pressure supply position and a maximum pressure supply position and operable to supply fluid of progressively increasing pressure to said fluid pressure means in accordance with the movement of said control element between said positions, a second control means associated with said first control means and operable to progressively decrease electrical energization of said electromagnetic means in accordance with the movement of said control element between said minimum pressure supply position and an intermediate pressure supply position and to de-energize said electromagnetic means upon movement of said control element beyond said intermediate pressure supply position towards said maximum pressure supply position, and a third control means responsive to variations in fluid pressure supplied to said fluid pressure means and operable to vary the electrical energization of said electromagnetic means to compensate for variations in the pressure supplied thereto.

References Cited in the file of this patent

UNITED STATES PATENTS

| 2,164,865 | Keiper | July 4, 1939 |
| 2,586,617 | Danly | Feb. 19, 1952 |

FOREIGN PATENTS

| 637,609 | France | Feb. 6, 1928 |